United States Patent
Marlin et al.

(10) Patent No.: US 9,688,155 B2
(45) Date of Patent: *Jun. 27, 2017

(54) AUTHENTICATION AND PAIRING OF A MOBILE DEVICE TO AN EXTERNAL POWER SOURCE

(71) Applicant: Silver Spring Networks, Inc., Redwood City, CA (US)

(72) Inventors: Eli Marlin, Daly City, CA (US); Cristina Seibert, Mountain View, CA (US)

(73) Assignee: SILVER SPRING NETWORKS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,859

(22) Filed: Jan. 4, 2016

(65) Prior Publication Data

US 2016/0119310 A1 Apr. 28, 2016

Related U.S. Application Data

(63) Continuation of application No. 14/660,319, filed on Mar. 17, 2015, now Pat. No. 9,256,897, which is a
(Continued)

(51) Int. Cl.
*G06F 1/26* (2006.01)
*B60L 11/18* (2006.01)
(Continued)

(52) U.S. Cl.
CPC ....... *B60L 11/1809* (2013.01); *B60L 11/1824* (2013.01); *B60L 11/1838* (2013.01); *B60L 11/1846* (2013.01); *B60L 11/1848* (2013.01); *G06F 1/26* (2013.01); *G06F 21/81* (2013.01); *G06F 21/84* (2013.01); *G06Q 30/04* (2013.01); *G06Q 50/06* (2013.01); *H04B 1/3883* (2013.01); *H04L 63/08* (2013.01); *H04L 67/30* (2013.01); *H04W 48/16* (2013.01); *G06F 2221/0704* (2013.01); *Y02T 10/7005* (2013.01);
(Continued)

(58) Field of Classification Search
CPC ... G06F 1/26; G06F 1/266; G06F 1/28; B60L 11/1809; B60L 11/1824; B60L 11/1838; B60L 11/1846; B60L 11/1848
See application file for complete search history.

(56) References Cited

U.S. PATENT DOCUMENTS 8,990,593 B2 3/2015 Marlin et al.
9,256,897 B2 * 2/2016 Marlin ................ B60L 11/1846
(Continued)

*Primary Examiner* — Dennis M Butler
(74) *Attorney, Agent, or Firm* — Buchanan Ingersoll & Rooney PC

(57) ABSTRACT

A mobile device communicates with an authenticator affiliated with a recharging facility, to identify itself. To confirm that the mobile device is connected to the correct facility, the authenticator instructs the mobile device to draw electrical charge according to an identifiable pattern. Upon detecting a charge being drawn according to that pattern, the authenticator has confirmation that the identified device is connected to the facility, and permits the charging to proceed. The amount of electricity drawn during the charging procedure can be metered, and then billed to a party associated with the identified mobile device.

16 Claims, 6 Drawing Sheets

Related U.S. Application Data continuation of application No. 13/362,416, filed on Jan. 31, 2012, now Pat. No. 8,990,593.

(51) Int. Cl.
  *G06F 21/81*   (2013.01)
  *G06F 21/84*   (2013.01)
  *G06Q 30/04*   (2012.01)
  *G06Q 50/06*   (2012.01)
  *H04B 1/3883*  (2015.01)
  *H04L 29/06*   (2006.01)
  *H04L 29/08*   (2006.01)
  *H04W 48/16*   (2009.01)

(52) U.S. Cl.
  CPC ........ *Y02T 10/7072* (2013.01); *Y02T 10/7094* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2010/0145568 A1 | 6/2010 | Watanabe |
| 2010/0274697 A1 | 10/2010 | Zyren |
| 2011/0191265 A1 | 8/2011 | Lowenthal et al. |
| 2012/0074903 A1 | 3/2012 | Nakashima |
| 2013/0119947 A1 | 5/2013 | Ishida et al. |

* cited by examiner

US 9,688,155 B2

AUTHENTICATION AND PAIRING OF A MOBILE DEVICE TO AN EXTERNAL POWER SOURCE

RELATED APPLICATIONS

This application is a continuation application of application Ser. No. 14/660,319, filed Mar. 17, 2015, which is a continuation of application Ser. No. 13/362,416, filed Jan. 31, 2012, now U.S. Pat. No. 8,990,593. The entire contents of this application are hereby incorporated by reference in its entirety.

FIELD OF THE INVENTION

The present disclosure relates generally to systems and methods for authentication of mobile devices and, more particularly, to the authentication of a mobile electric device using a charging pattern of the mobile device.

BACKGROUND OF THE INVENTION

Many different electronic and mechanical devices include battery storage, which are connected to the electric utility grid for recharge. Generally, costs for the energy used to recharge such mobile devices are assessed to the owner or provider of the outlet used for charging the mobile device, and are billed based on meter reading at the owner's meter associated with the outlet used for charging.

SUMMARY OF THE DISCLOSURE

In accordance with embodiments disclosed herein, the cost associated with the recharging of a mobile device can be allocated to the owner of the device, rather than the premises where the outlet is located, through a procedure for authenticating the device owner at the time of recharging the device. The mobile device communicates with an authenticator affiliated with the recharging facility, to identify itself. To confirm that the mobile device is connected to the correct facility, the mobile device draws a charge according to a pattern that is recognized by the authenticator. Upon detecting a charge being drawn according to that pattern, the authenticator has confirmation that an identified device is connected to the facility, and permits the recharging to proceed. The amount of electricity drawn during the recharging procedure can be metered, or otherwise determined and then billed to a party associated with the identified mobile device.

BRIEF DESCRIPTION OF THE DRAWING FIGURES

The invention is best understood from the following detailed description when read in conjunction with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

Mobile electric devices such as plug-in electric cars, laptop computers, notebook computers, PDAs, and cell phones, among others, are proliferating with the advent of a more mobile society. The ability to recharge such devices may be limited to electrical outlets associated with an owner of the mobile electric devices (e.g., where the billing account associated with electrical outlet and the owner of the mobile device are the same entity) or where the billing account owner associated with the electrical outlet allows the owner of the mobile device to recharge the mobile device at no charge. The owner associated with an electrical outlet generally refers to the individual or entity who is financially obligated, to pay for the electricity consumed at the electrical outlet, which may include the owner of the electrical outlet or a third party responsible for such payments.

In various exemplary embodiments, a mobile electronic device may be authenticated to the electrical outlet, power connection or power source used for charging. By authenticating to such an outlet, power connection or power source, the billing account associated with the mobile device may be billed for the cost of recharging of the mobile device.

In certain exemplary embodiments, an authenticator may negotiate or specify a load pattern used by the mobile electronic device to identify its pairing with the electrical outlet, the power source or the power connection.

To facilitate an understanding of the concepts that underlie the invention, exemplary embodiments are described in which the mobile device is a plug-in electric vehicle. It will be appreciated, however, that the mobile electric device may be any device which is mobile and capable of recharge from any power source such as the electric grid, a generator, or another mobile device, among others.

Figure 1:
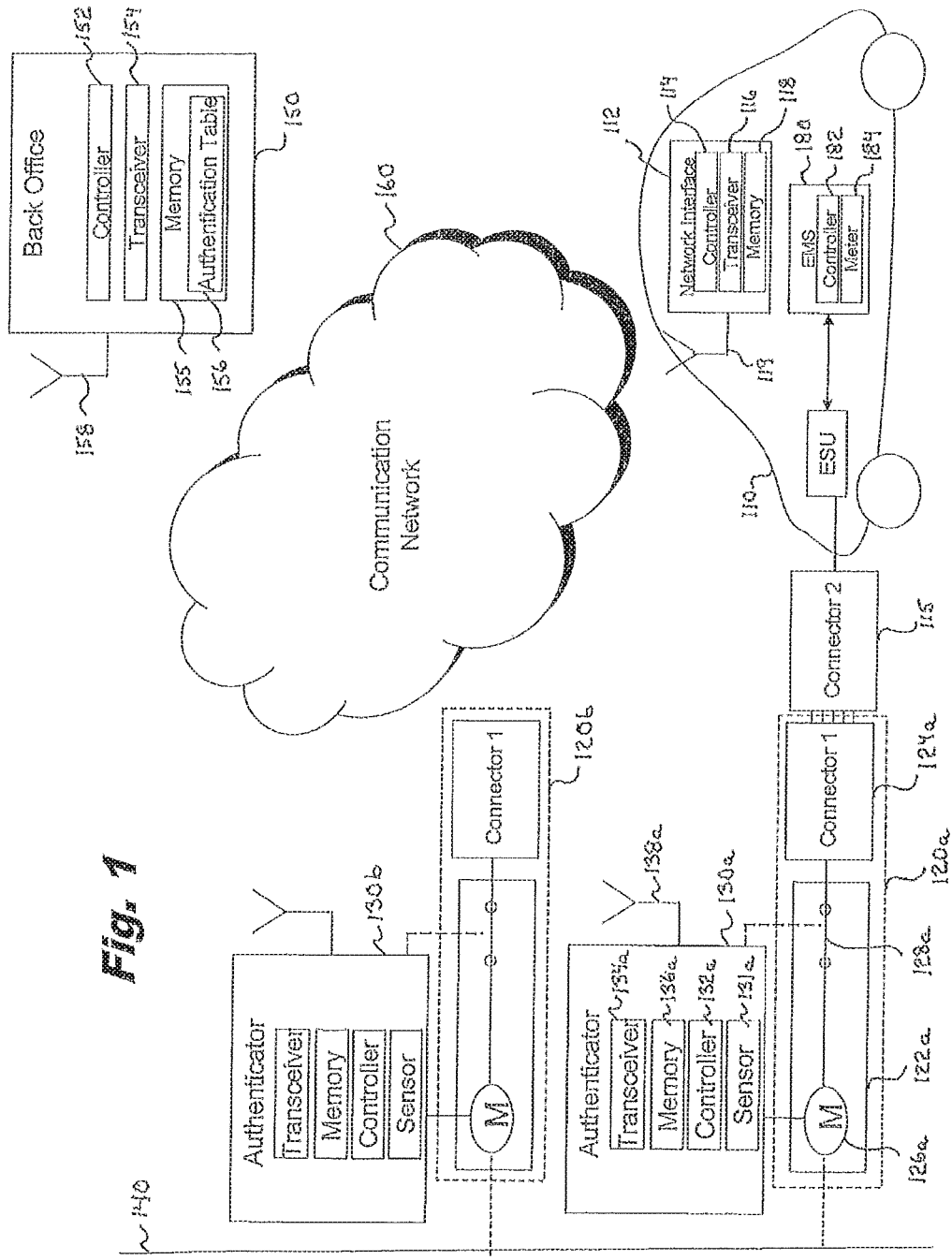
FIG. 1 is a schematic diagram illustrating a system for authenticating a pairing of a power source and mobile device in accordance with an exemplary embodiment of the present invention.

FIG. 1 is a schematic diagram illustrating a system 100 for authenticating a pairing of a power source 122a and mobile electrical device 110 in accordance with exemplary embodiments disclosed herein. Referring thereto, system 100 may include mobile electric device 110, first electric supply site 120a, second electric supply site 120b, first authenticator 130a, second authenticator 130b and electric grid 140. The apparatus and functions associated with first electric supply site 120a are substantially the same as those of second electric supply site 120b.

First electric supply site 120a may include first power source 122a and first connector 124a. First electric power source 122a may be connected to utility grid 140 for supply of electric power to first connector 124a, or may be a stand alone power source for generating electrical power.

Although first electric power supply 122a is shown connected to electric grid 140, it is contemplated that any power source may be used, including both alternating current (AC) and direct current (DC) power sources such as batteries, fuel cells, photovoltaics, and electric generators, among others. First electric power source 122a may include a meter/sensor 126a and a load switch 128a.

Meter/sensor 126a may measure current draw through first electric power source 122a. Meter sensor 126a may be coupled to first authenticator 130a. First authenticator 130a may be located at the first electric supply site or may be located remotely, for example, in a vicinity of a plurality of electric metering sites or in the vicinity of back office 150.

Although first authenticator 130a is shown coupled to meter/sensor 122a, it is contemplated that first authenticator 130a may be coupled to any number of meters/sensors to measure the charge (e.g., current) drawn at a plurality of electric meter sites for authentication of the electrical outlets, power sources or power connections with mobile devices. In certain exemplary embodiments, one authenticator may measure charge drawn from electric meter sites associated with a specified geographic area (e.g., a parking lot, a plurality of parking spots, or a recharging center, among others). In other exemplary embodiments, such an authenticator may be associated with or located at back office 150 and may measure charge draw associated with electric meter sites associated with back office 150.

Load switch 128a may be controlled by first authenticator 130a to connect or disconnect electric utility grid 140 or power source 120a from mobile device 110. Although load switch 128a is shown to connect or disconnect power entirely to/from mobile device 110, it is contemplated that load switch 128a may only connect or disconnect a portion of the load of mobile device 110 (e.g., charging circuits of mobile device 110) from power source 122a or electric utility grid 140. For example, electric meter site 120a may continue to enable power supply to mobile device 110 for functions such as communications with first authenticator 130a and other processing functions of mobile device 110 using a low power connection via first connector 124a.

Although load switch 128a is shown as a single-pole single-throw switching device, it is contemplated that load switch 128a may include other configurations to connect or disconnect other connections including, for example a ground connection, a communications connection, and/or a presence detection circuit, among others.

First authenticator 130a may include a current sensor 131a, a controller 132a, a transceiver 134a, a memory 136a and an antenna 138a. Mobile device 110 may include a network interface 112 having a controller 114, transceiver 116, memory 118, and antenna 119. Controller 132a and controller 114 may establish, a communication session (e.g., an internet protocol (IP) session) via transceiver 134a and antenna 138a of first authenticator 130a and transceiver 116 and antenna 119 of network interface 112. Controller 132a may receive information (including measurements, meter readings and/or sensor readings, among others) from meter/sensor 126a of first electric metering site 120a. First connector 124a of first electric metering site 120a may connect to connector 115 of mobile device 110 to electrically connect power source 122a and/or utility grid 140 to mobile device 110.

Although a converter is not shown in FIG. 1, mobile device 110 may include a converter to convert AC power to DC power. It is also contemplated that such a converter may be disposed between utility grid 140 and mobile device 110.

System 100 may include back office 150 in communication with a plurality of authenticators (e.g., first and second authenticators 130a and 130b) via communication network 160. Back office 150 may include a controller 152, a transceiver 154, and a memory 155 (e.g., including authentication tables 156). Controller 152 may control the operation of back office 150. Transceiver 154 may receive and send information via communication network 160 to first and/or second authenticators 130a and 130b. Memory 155 may include data structures used to uniquely identify load patterns monitored by first or second authenticator 130a or 130b with a mobile device identifier. Authentication tables 156 may include account and billing information associated with mobile devices in system 100.

In one embodiment, authentication tables 150 may include records having unique identifiers associated with each mobile device. When mobile device 110 connects to first electric metering site 120a via first connector 124a, first authenticator 130a may monitor for a current draw at first connector 124a. The current draw may have a unique load pattern that identifies mobile device 110. For example, network interface 112 may have a media access control (MAC) address (e.g., a unique address) that is associated with network interface 112. The MAC address may be encoded as a unique load pattern associated with mobile device 110.

In an alternate embodiment, rather than employ a public address or the like as the identifier of the mobile device, a secure value, such as a secret key, that is stored at both the authenticator and the mobile device can be employed as the unique identifier of the mobile device. Furthermore, the same identification credentials can be employed by a group of users. For instance, all of the members of a family who charge to the same billing account can share the secret key, and use it to identify their mobile devices to the authenticator. In a similar manner, a group address or other such form of shared credential can be employed to identify, and authenticate, all of the members of a group.

First authenticator 130a may monitor for the unique load pattern of mobile device 110 and may authenticate the pairing of mobile device 110 with the first electric metering site 120a (and/or first power source 122a) in response to the unique load pattern being detected. First authenticator 130a may continuously monitor first electric metering site 120a via meter/sensor 126a to determine current draw from connector 124a. First authenticator 130a may determine the start of a unique load pattern based on current draw at first connector 124a which is below a threshold level for a specified period of time (e.g., for greater than one minute) followed by a series of loads (the load pattern) which exceeds the threshold level during at least a portion of an authentication period.

First authenticator 130a may determine an end to the unique load pattern based on the same or similar criteria as the start of the unique load pattern. That is, during the unique load pattern, load may exceed a threshold level to generate a sequence of load values above and below a load reference value, which will dynamically change based on at least a unique identifier of mobile device 110 (e.g., based on a MAC address, a unique identifier, or some other predetermined unique identifier of mobile device 110 and associated with network interface 112). First authenticator 130a may request validation from back office 150 using authentication tables 156 to validate the unique load patterns of mobile device 110. For example, controller 132a may convert the unique load pattern detected from meter/sensor 126a to a digital code and may request validation of the converted code from back office 150.

Back office 150 may validate the converted code from first authenticator 130a and may provide a message indicating the authentication of mobile device 110. Controller 132a of first authenticator 130a, upon receiving the message authenticating mobile device 110, may control load switch 128a to maintain a connection between power source 122a and mobile device 110.

In certain exemplary embodiments, first authenticator 130a may include memory 135a for storing program code executable by controller 132a and for storing information sent from authentication tables 156 for local authentication. For example, once mobile device 110 is authenticated (e.g., paired) with first electric metering site 120a, authentication information associated with mobile device 110 (e.g., the unique load, pattern of mobile device 110) and an identifier included in authentication tables 156 to identify mobile device 110 may be stored locally in memory 135a of first authenticator 130a, such that first authenticator 130a may authenticate the same mobile device in a subsequent authentication process (without back office 150) based on rules established by back office 150 (e.g., when the planned current draw by mobile device 110 is below a threshold, when mobile device is of a certain type (e.g., a laptop, a PDA, a cell phone, or a plug-in vehicle) or may be set as a flag in memory 135a from back office 150 based on criteria set by back office 150).

Mobile device may include an energy storage unit 170 and a energy management device 180. Energy management device 180 may include a controller 182 and a metering unit 184. Controller 182 of energy management device 180 may control charging and discharging of energy storage unit 170 to power, for example, mobile device 110.

In certain exemplary embodiments, the energy management device 180 may be integral to a vehicle management system. In other exemplary embodiments, the energy management device 180 may be separate from and in communications with the vehicle management system.

Figure 2:
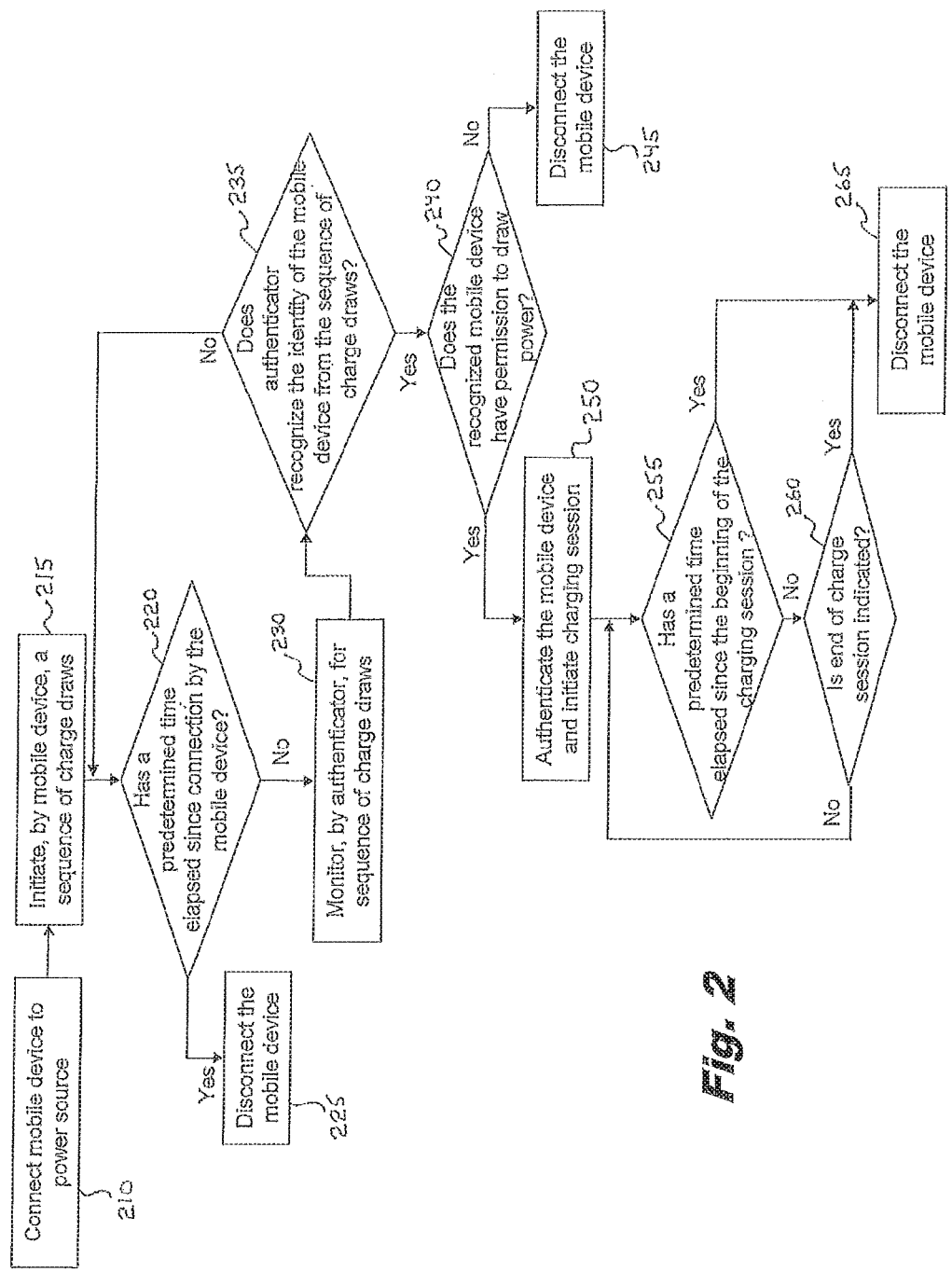
FIG. 2 is a flowchart illustrating a method of authentication of a mobile device in accordance with a first exemplary embodiment.

FIG. 2 is a flowchart of the pairing authentication in accordance with the first embodiment. At step 210, mobile device 110 is connected to a power source (e.g., first electric metering site 120a). At step 215, mobile device 110 may initiate a sequence of charge draws. At step 220, first authenticator 130a may determine whether a predetermined time has elapsed since the connection of mobile device 110 to first electric metering site 120a. At step 225, responsive to the predetermined time being exceeded, mobile device 110 may be disconnected from first electric metering site 120a via a load switch 122a. At step 230, responsive to the predetermined time not being exceeded, first authenticator 130a may monitor for the sequence of charge draws. At step 235, first authenticator 130a may determine whether the identity of mobile device 110 is recognizable from the sequence of charge draws. For example, first authenticator 130a may match the sequence of charge draws with a unique identifier of mobile device 110. In certain exemplary embodiments, the unique identifier of mobile device 110 may be stored in authentication tables 158 of back office 150. In such exemplary embodiments, first authenticator 130a may request via communication network 160 authentication information stored in authentication tables 158. The request for authentication information may be sent via transceiver 134a of first authenticator 130a, communication network 160 and transceiver 154 of back office 150. In alternate exemplary embodiments, first authenticator 130a may include authentication tables not shown) for authentication locally (without communication with back office 150).

In other alternative exemplary embodiments, first authenticator 130a may send a logical series of bits corresponding to the sequence of charge draws to back office 150 via communication network 160 and back office 150 may determine and direct first authenticator 130a regarding the recognition of the identity of the mobile device from the sequence of charge draws. Responsive to the first authenticator 130a and/or back office 150 not, recognizing the identity of the mobile device from the sequence of charge draws, processing is sent to step 220 to determine whether a predetermined amount of time has elapsed since connection by mobile device 110. If the predetermined amount of time has elapsed, the mobile device is disconnected at step 225, to thereby prevent a rogue device from continuing to draw current via the authentication process.

Responsive to first authenticator 130a and/or back office 150 recognizing the identity of the mobile device from the sequence of charge draws, back office 150 may validate at step 240 whether the recognized mobile device has permission to draw power. For example, back office 150 may correlate the recognized identity of mobile device 110 with a billing account and it may determine, based on billing activity, payment terms, arrearages, among others, whether to permit the draw of power. If the back office does not permit the draw of power, back office 150 may send a message to first authenticator 130a to block a charging session. For example, first authenticator 130a may control load switch 128a to disconnect mobile device 110, at step 245. At step 250, responsive to the recognized mobile device having permission to draw power, the first authenticator 130a may authenticate mobile device 110 and initiate a charge session. At step 255, first authenticator 130a may determine whether a predetermined time has elapsed since the beginning of the charge session. Responsive to the predetermined time having elapsed, mobile device 110 may be disconnected from first electric metering site 120a using load switch. 128a. Responsive to the predetermined time not having elapsed, first authenticator 130a may monitor for an indication that the charge session has ended. For example, first authenticator 130a. may monitor for a current draw below a threshold level for a specified period to indicate the end of a charge session.

If the end of a charge session is indicated, first authenticator 130a may control load switch 128a to disconnect mobile device 110 at step 265. If the end of a charging session is not indicated by the monitored charge draw, at step 260, processing is transferred to step 255 to determine if a predetermined time has elapsed since the beginning of the charge session.

Figure 3:
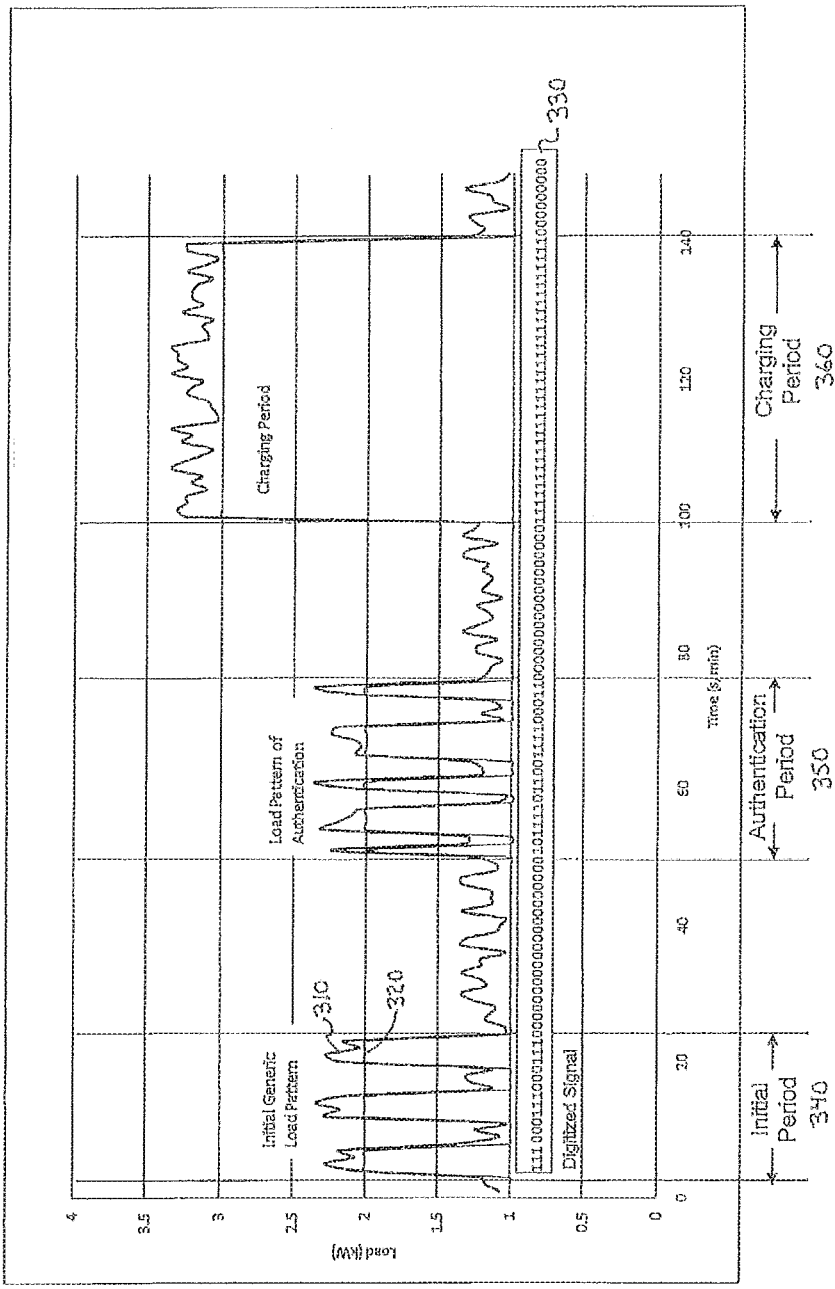
FIG. 3 is a graph illustrating a load pattern used in systems and methods in accordance with exemplary embodiments of the present invention.

FIG. 3 is a graph of one example of a possible load pattern. The graph includes load history 310 and filtered data 320 which corresponds to load history data with. high frequency components (e.g., components above a threshold frequency) removed. The load history represents a series of load patterns provided by mobile device 110. Prior to sending its unique identification, the mobile device may first draw current according to a generic pattern that indicates an intent to draw power, during an initial period 340. The load pattern during the initial period 340 may indicate that mobile device 110 is connected to the utility grid via first electrical metering site 120a, and alerts the authenticator 130a to begin looking for a load pattern that indicates a unique identifier. Thereafter, the mobile device 110 sends its identifier during an authentication period 350. The load pattern associated with mobile device 110 presents a binary pattern 330 that is derived from filtered data 320.

In response to detection and authentication of a specified load pattern, the first authenticator 120a may enable the initiation of a charging period 360. If a valid load pattern is not detected, the first authenticator 120a may control the load switch 128a to open and disconnect the mobile device from the external power source. That is, the first authenticator 120a blocks charging of the mobile device 110.

In one implementation of the first embodiment, the unique identifier of the mobile device may be a secret that is shared between the mobile device and the authenticator, rather than being transmitted in the clear. For example, each of the authenticator and the mobile device may store an algorithm that is seeded by the identifier of the mobile device and an identifier of the authenticator, such as its MAC address. When the mobile device initiates the generic load pattern during the initial period 340, the authenticator can respond with its identifier, by varying any parameter of the power that is capable of being detected by the mobile device. For instance, the authenticator may cause the power source 122a to vary the voltage, phase or current of the power, or simply turn the power on and off, so as to encode the identifier in the power received via the connectors 115 and 124a. In response to receiving this identifier, the mobile device can execute the algorithm, using the received identifier and its own unique identifier as inputs, to obtain a result value. This result value is sent to the authenticator during the authentication period. Applying an inverse of the algorithm to the received result value, the authenticator can then derive the unique identifier of the mobile device. This derived identifier can then be checked against the table of authorized identifiers to authenticate the mobile device.

In the first embodiment described above, the communication between the mobile device and the authenticator are carried out via the power line connection, through current draws or other forms of modulation of the power delivered to the mobile device. In a second embodiment described hereinafter, wireless RF communication can be employed to transmit at least some of the information that is exchanged between the mobile device and one or more authenticators.

Figure 4:
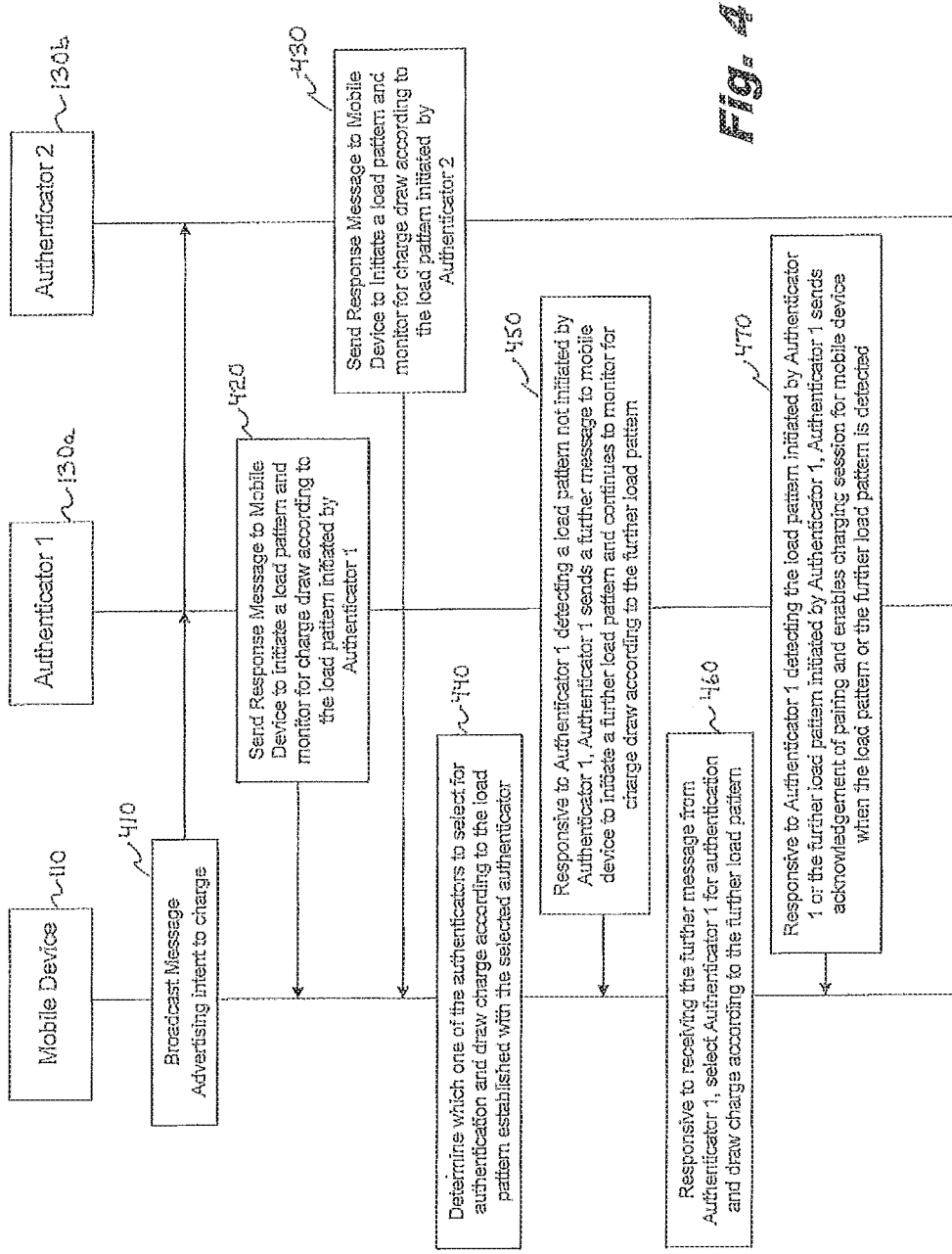
FIG. 4 is a timing diagram illustrating communications between or among a mobile device and authenticators in accordance with a second exemplary embodiment.

Now referring to FIG. 4, at step 410, when the mobile device 110 is plugged into a power outlet, it may broadcast a message to authenticators within operational range authenticators 130a and 130b via the network interface 112 and antenna 119. The broadcast message may advertise an intent for mobile device 110 to charge. First authenticator 130a and second authenticator 130b may each send a response message to mobile device 110 to initiate a load pattern, at steps 420 and 430, respectively. The load pattern may be specific to each authenticator, and/or a time stamp. Alternatively, the pattern may be specific to mobile device 110, a fixed pattern, or portions of the load pattern may be a combination thereof. In certain exemplary embodiments, the load pattern may be based on a unique identifier of the mobile device 110 and may be obscured by hashing the unique identifier with a hash algorithm.

Responsive to receiving one or more response messages from first authenticator 130a and second authenticator 130b, at step 440 mobile device 110 may determine Which one of the authenticators in its operational range (e.g., first authenticator 130a or second authenticator 130b) to select for authentication. The selection of authenticator 130a. or authenticator 130b may be based on the authenticator having the highest signal strength. Alternatively, or in addition, the mobile device may store a list of known addresses, and select an authenticator based on an address included in the responses from the authenticators. Mobile device 110 may draw charge according to the load pattern established with the selected authenticator (e.g., first authenticator 130a).

Although first authenticator 130a and second authenticator 130b are shown in the timing diagram of FIG. 4, it is contemplated that more or fewer authenticators may be within operating range of mobile device 110 and each authenticator may send a response message and monitor for charge draw. In certain exemplary embodiments, the selection of the authenticator may be improper (i.e., mobile device 110 may choose an authenticator associated with an electric metering site not connected to mobile device 110). FIG. 4 depicts a situation in which the mobile device 110 selects the second authenticator 130b, but it is connected to the power source associated with the first authenticator 130a. At step 450, the authenticator which discovers a load draw after sending a response message to mobile device 110 (in this case authenticator 130a) may send a further response message to indicate to mobile device 110 that the authenticator has monitored a charge draw and also indicating the proper load pattern for the mobile device 110. At step 460, mobile device 110 may then determine the proper authenticator and draw charge according to the load pattern established with the proper authenticator.

At step 470, based on the monitoring at step 420, first authenticator 130a (as the selected authenticator) determines that mobile device 110 is drawing charge according to the load pattern indicated in the response message at step 420. First authenticator 130a may send an acknowledgment of the pairing of mobile device 110 with first electric metering site 120a and may enable the initiation of a charge session for mobile device 110 based on the detected load pattern (e.g., When responsive to the load pattern being detected).

In certain embodiments the reselection of an authenticator may be eliminated if the load pattern is based on only the unique identification associated with mobile device 110, such as a Mac address or other unique identifier.

Figure 5:
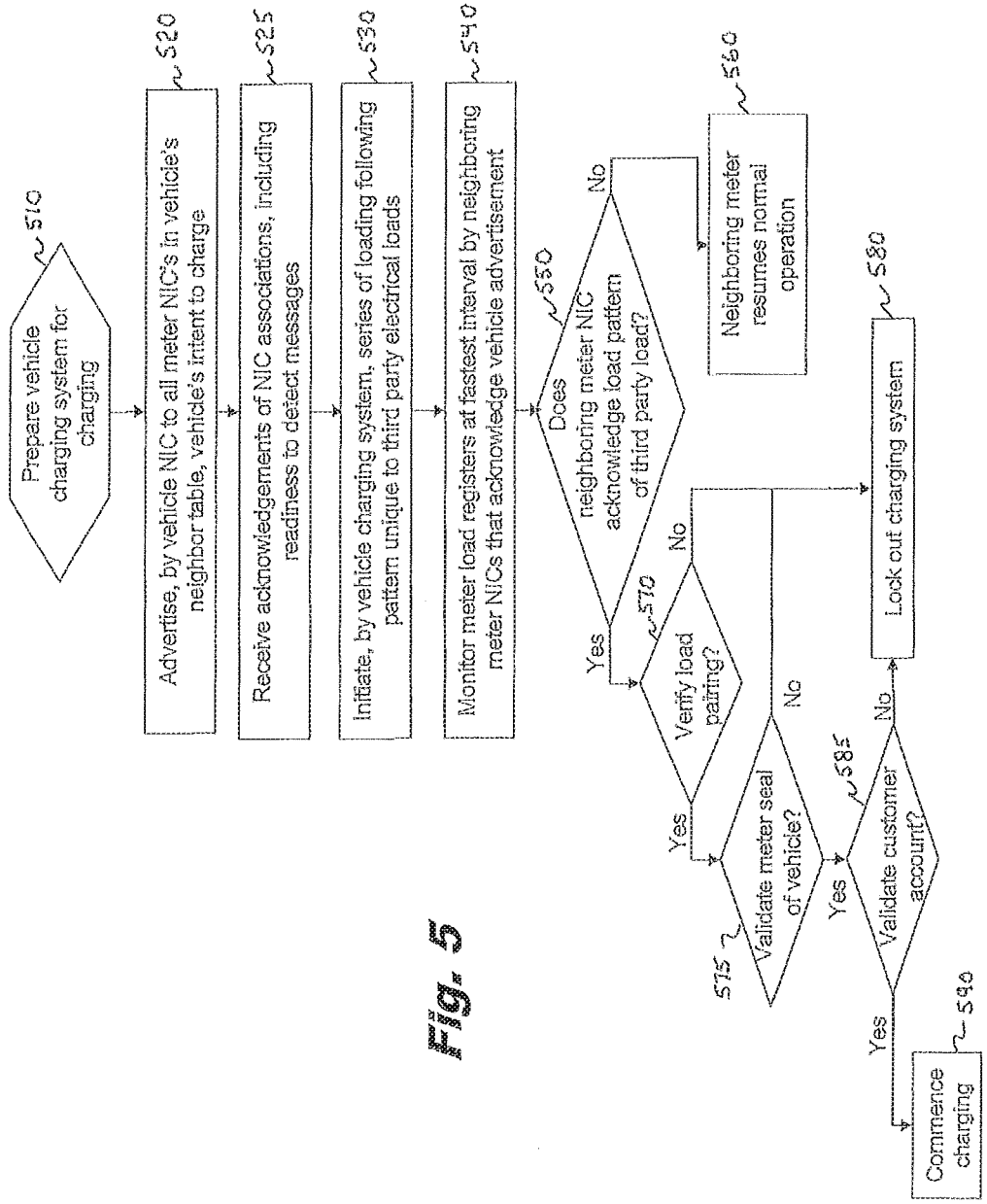
FIG. 5 is a flowchart illustrating a method of managing a charging session in accordance with the second exemplary embodiment.

Now referring to FIG. 5, at step 510, the charging system of mobile device 110 (e.g., a plug-in vehicle) may be prepared for charging. At step 520, the mobile device's network interface (e.g., the plug-in vehicle's network interface card) may advertise to all authenticators (e.g., all meter network interface cards) stored in the mobile device's memory 117 (e.g., as a neighborhood table in memory 117) the plug-in vehicle's intent to charge. At step 525, the mobile device's network interface receives acknowledgement from the neighboring NICs in response to the advertisement, indicating their readiness to detect a message. At step 530, the charging system 111 of plug-in vehicle 110 may initiate a series of loading following a pattern indicative of third party electrical loads. At step 540, neighboring meter network interface cards that acknowledge vehicle advertisement monitor the load registers of their respective meters at a predetermined interval. For example, the sampling interval for load registers associated with meters that may be used for charging the plug-in vehicle's charging system may be increased from a normal sample range of about 30 seconds to about five minutes, to a faster range of about five seconds to about one minute, depending on the metering unit 126a used. At step 550, the neighboring meter network interface card may determine whether to acknowledge the load pattern. Responsive to the neighboring meter network interface controller 132a acknowledging the load pattern of the third party load, at step 570, the load pairing of first electric metering site 120a and plug-in vehicle 110 are verified using any of the previously disclosed authentication processes. At step 560, if the neighboring meter network interface controller does not acknowledge the load pattern of the third party load, the monitoring of the load registers of the neighboring meter (e.g., meter unit 126a) may resume normal operations. For example, the sampling interval of the meter registers may be adjusted to a normal interval.

Figure 6:
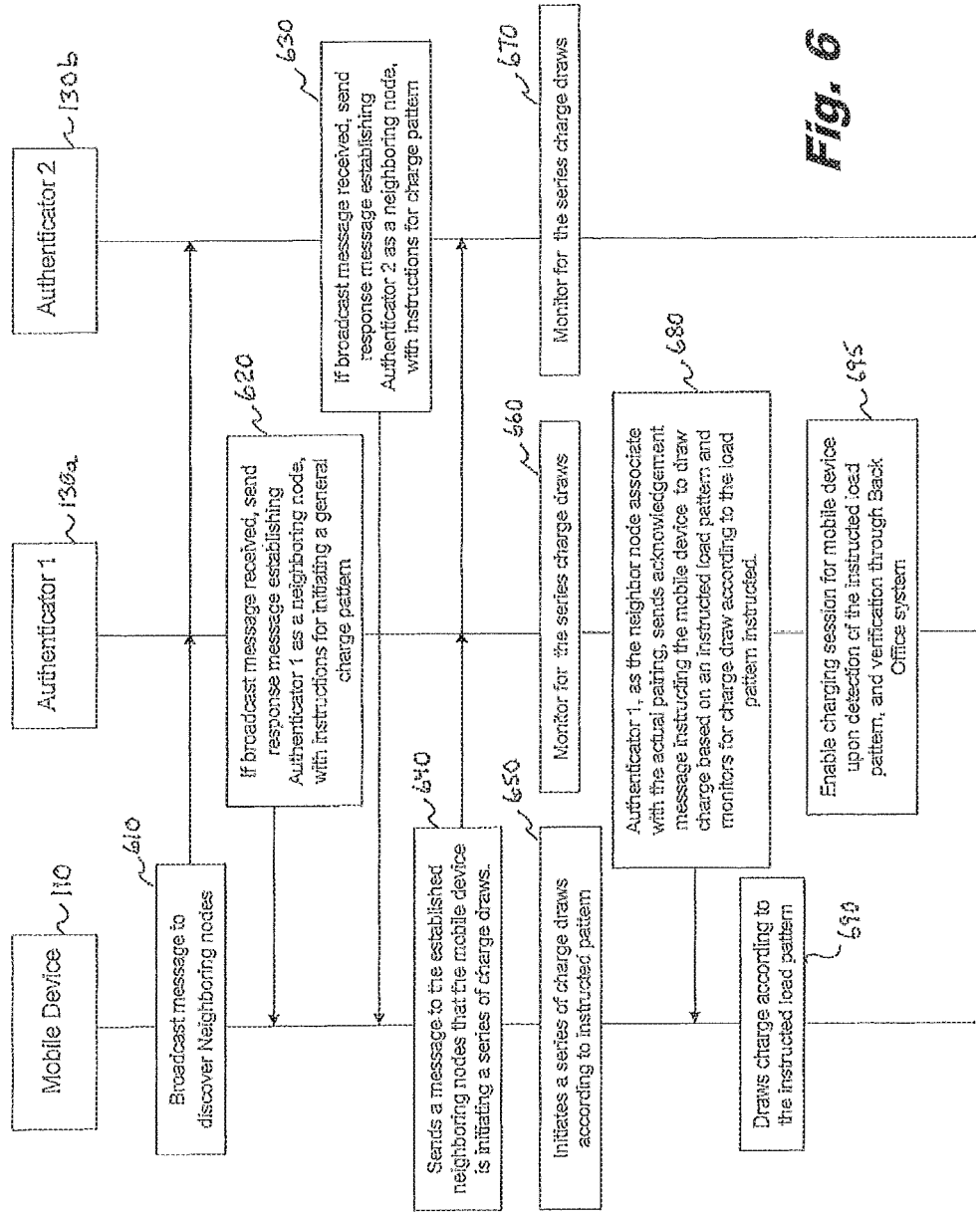
FIG. 6 is timing diagram illustrating communications between or among a mobile device and authenticators in accordance with a third exemplary embodiment.

At step 575, if the load pairing of the first electric metering site 120a and plug-in electric vehicle 110 is validated, the meter seal of the plug-in vehicle 110 is validated. At step 580, if the load pairing is not verified at step 570, the vehicle charging system is locked out. For example, the load switch 128a of first electric metering site 120a may be disconnected by meter network interface controller 132a. Further, if the meter seal of plug-in vehicle 110 is not validated, the vehicle charging system of plug-in vehicle 110 may be locked out at step 580. If the meter seal of plug-in vehicle 110 is validated at step 575, the back office determines Whether the customer account associated with the plug-in vehicle is valid at step 585. For example, the hack office 150 may determine that the customer account has sufficient pre-paid funds or that a valid credit account is associated with the customer account. If the customer account is validated, the back office may send a charging commencement message to the meter network interface controller 132 to commence charging at step 590. If the customer account is determined to be invalid by back office 150, the back office may send an invalid account message to meter network interface controller 132a at step 580 to cause vehicle charging system of plug-in vehicle 110 to be locked out.

in another embodiment, the mobile device may first attempt to discover potential hosts within its communication range. Referring to FIG. 6, at step 610, mobile device 110 may broadcast a message to discover other communication nodes in operational range (e.g., one-hop nodes or neighboring nodes). For example, mobile device 110 may broadcast a message to first authenticator 130a and second authenticator 130b. Any neighboring node (authenticator) receiving the broadcast message directly from mobile device 110 may respond by sending a response message establishing the respective node (authenticator) as a neighboring or one-hop node. For example, at step 620, first authenticator 130a may receive directly from mobile device 110 the broadcast message, and may reply with a response message indicating that authenticator 130a is a neighboring or one-hop node of mobile device 110. This response may include instructions to initiate a general charge pattern. At step 630, second authenticator 130b may receive the broadcast message directly from mobile device 110 and may send a response message with instructions to for a charge pattern, establishing second authenticator 130b as a neighboring or one-hop node as well.

Mobile device 110 may receive the response messages from the authenticators which neighbor the mobile device. At step 640, the mobile device may send a message to the established neighboring nodes that mobile device 110 is initiating a series of current draws. In certain exemplary embodiments the current draws may be below a threshold level and/or may be a predetermined/fixed series of charge draws that are generic to third-party connections. At step 650, mobile device 110 may initiate a series of charge draws according to the instructed pattern, and at steps 660 and 670 first authenticator 130a and second authenticator 130b may monitor for the series of charge draws, respectively. In the example of FIG. 6, the mobile device is connected to the power source 122a associated with authenticator 130a. First authenticator 130a, upon detecting the current draw, may send an acknowledgment message instructing the mobile device to draw charge based on a unique, predetermined, specified, or negotiated load pattern and may monitor for charge draw according to the instructed load pattern, at step 680. Mobile device 110 may receive the acknowledgment message and may draw charge according to the instructed load pattern, at step 690. At step 695, the authenticator may enable a charge session for mobile device 110 upon detection of the instructed load pattern and verification through the back office system.

From the foregoing, therefore, it can be seen that the disclosed embodiments provide techniques for associating and authenticating a mobile device with external power sources that can be used to charge the device. Communication between the mobile device and the power source is carried out via the manner in which the device draws power from the source. In some embodiments, wireless communication between the mobile device and the power source are used to enhance the capabilities for pairing the mobile device with the power source, and authenticating the device.

Once the pairing and authentication have been achieved, various approaches can be employed to quantify the amount of charge delivered to the mobile device. In one implementation, a standard rate of charge draw can be established for a given category of device. By measuring the duration of the charging period, the authenticator at the location of the power source can determine the amount of charge delivered, and report it to the back office 150, for debiting the account of the device owner.

In another implementation, a sealed, tamper-proof meter can be installed in the mobile device and connected to its wireless network interface 112. Once the pairing has been established, the authenticator or the back office can send a command via the network interface, to begin measuring the current draw, and report back, either during the transaction period or upon completion of the period.

If metering is possible at both the site of the source and within the mobile device, the charge amount measured. at each location can be checked against one another for confirmation. In addition, the amount measured at the source can be employed to check the calibration, and/or detect tampering, of the meter in the mobile device.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for managing a charging session with a mobile device, comprising:
   a mobile device; and
   a wireless communication network comprised of a plurality of nodes, each node being associated with a charging device and configured to communicate between the associated charging device and the mobile device, wherein
   the mobile device is configured to
      send a broadcast message to one or more of the plurality of nodes in the wireless communication network requesting a charging session,
      receive, in response to the broadcast message, a corresponding instruction from at least two of the plurality of nodes in the wireless communication network to initiate a unique load pattern associated with the mobile device,
      select one of the received instructions for execution, and
      draw a charge in accordance with the unique load pattern corresponding to the selected instruction.

2. The system of claim 1, further comprising:
a plurality of charging devices, wherein each charging device is associated with a corresponding one of the plurality of nodes of the wireless communication network.

3. The system of claim 2, wherein each charging device is configured to receive an authentication signal from the mobile device and respectively authenticate the mobile device based on the received authentication signal.

4. The system of claim 2, wherein each charging device is configured to supply power to the mobile device from a power source based on the unique load pattern corresponding to the received instruction.

5. The system of claim 1, wherein
the broadcast message includes an authentication signal,
each node of the plurality of nodes is configured to authenticate the mobile device using the authentication signal, and
the corresponding instructions are sent to the mobile device from the at least two of the plurality of nodes subsequent to corresponding authentication of the mobile device by the at least two nodes, respectively.

6. The system of claim 1, further comprising:
a back office system configured to associate the charge drawn by the mobile device with an account associated with the mobile device.

7. A method for managing a charging session with a mobile device, comprising:
sending, from a mobile device, a broadcast message requesting a charging session to at least one node among a plurality of nodes of a wireless communication network, wherein each node is associated with a charging device and is configured to communicate between the associated charging device and the mobile device;
receiving, by the mobile device, a corresponding instruction from at least two of the plurality of nodes in the network to initiate a unique load pattern associated with the mobile device;
selecting, by the mobile device, one of the received instructions for execution; and
drawing a charge at the mobile device in accordance with the unique load pattern corresponding to the selected instruction.

8. The method of claim 7, further comprising:
receiving, by each charging device associated with a corresponding one of the nodes, an authentication signal from the mobile device; and
authenticating, by each charging device, the mobile device based on the received authentication signal.

9. The method of claim 7, wherein the charge drawn by the mobile device is supplied from the charging device associated with the one of the plurality of nodes.

10. The method of claim 7, wherein
the broadcast message includes an authentication signal,
the plurality of nodes respectively authenticate the mobile device using the authentication signal, and
the corresponding instructions are sent to the mobile device from the at least two of the plurality of nodes subsequent to corresponding authentication of the mobile device by the at least two nodes, respectively.

11. The method of claim 7, further comprising:
associating, by a back office system, the charge drawn by the mobile device with an account associated with the mobile device.

12. A mobile device, comprising:
a network interface configured to establish a communication session with a wireless communication network comprised of a plurality of nodes, each node being associated with a charging device and configured to communicate between the associated charging device and the mobile device;
a transceiver configured to
send a broadcast message to one or more of the plurality of nodes in the wireless communication network requesting a charging session, and
receive a corresponding instruction from at least two of the plurality of nodes in the wireless communication network to initiate a unique load pattern associated with the mobile device; and
a controller configured to
select one of the received instructions for execution, and
draw a charge in accordance with the unique load pattern corresponding to the selected instruction.

13. The mobile device of claim 12, wherein
each charging device is associated with a corresponding one of the plurality of nodes of the network,
the transceiver is configured to transmit an authentication signal to the corresponding charging devices respectively associated with the plurality of nodes, and
the controller is configured to draw the charge in accordance with the unique load pattern corresponding to the selected instruction from the charging device associated with one of the plurality of nodes from which the selected instruction was received, upon being authenticated by the charging device associated with the one of the plurality of nodes.

14. The mobile device of claim 12, wherein the charge drawn by the controller of the mobile device is supplied by a charging device respectively associated with one of the plurality of nodes from which the selected instruction was received, and the charge drawn by the controller is based on the unique load pattern corresponding to the received instruction.

15. The mobile device of claim 12, wherein
the broadcast message includes an authentication signal,
each node of the plurality of nodes is configured to authenticate the mobile device using the authentication signal, and
the instruction is sent to the mobile device from the one of the plurality of nodes subsequent to the authentication of the mobile device.

16. The mobile device of claim 12, wherein a back office system of the network is configured to associate the charge drawn by the controller of the mobile device with an account associated with the mobile device.

* * * * *